Patented Feb. 7, 1933

1,896,529

UNITED STATES PATENT OFFICE

DONALD K. TRESSLER, OF GLOUCESTER, AND KARL B. NORTON, OF MANCHESTER, MASSACHUSETTS, ASSIGNORS TO FROSTED FOODS COMPANY, INC., OF DOVER, DELAWARE, A CORPORATION OF DELAWARE

LIQUID FOOD PRODUCT AND METHOD OF PACKAGING THE SAME

No Drawing. Application filed September 6, 1930. Serial No. 480,196.

This invention relates to an improved method of preparing and packaging liquid or semi-liquid food products of perishable nature for distribution to the consumer and includes within its scope the novel package so produced.

In one aspect our invention comprises an improvement in the field of preparing and packaging liquid food products such, for example, as fruit juices, sauces, gravies, cream and the like, so that they may be stored, distributed under commercial conditions and reach the consumer with their full pristine flavor and aroma, although these characteristics in the fresh product may be delicate, fugitive and easily impaired. We have discovered that the desired results may be effected by converting the liquid or semi-liquid food product into frozen cakes and then protecting each cake against oxidation, evaporation and tainting by coating the cake with an aqueous glaze.

An important field of use of the invention is in packaging the fresh juice of fruits and the invention will be first discussed, by way of illustration, in its application to that product. The problem of preserving fresh fruit juice without deterioration in flavor or decomposition, so that it may be distributed under commercial conditions, presents many difficulties. In the first place, the fresh juices, upon being separated from the fruit, almost immediately begin to undergo change of flavor and deterioration due to oxidation, bacteriological action and other chemical or fermentive processes. In the second place, fresh fruit juices undergo mechanical change in composition, due to coagulation, separation or breaking down of the emulsion in which its various components are suspended and this mechanical deterioration has been heretofore hastened or intensified by the preservative processes to which the fresh juice is subjected. For example, in slow freezing the fruit juice, the pure water content tends to separate in the form of ice crystals which enclose an increasingly concentrated extract as the freezing continues. Further, the essential oils to which most of the flavor and odor of the fresh fruit juice is due are volatile and tend to disappear even at low temperatures. Fresh fruit juices, by our invention, may be preserved with all their natural flavor and without change in composition by converting the juice, under conditions which prevent oxidation and evaporation, into a frozen cake and then immediately protecting the cake by coating it with a continuous glaze of ice.

In the treatment of fresh fruit juices, it is important, for reasons already outlined, to reduce to a minimum the time during which the juices, either as liquid or in frozen condition, are exposed to the atmosphere. Our invention, accordingly, contemplates a method in accordance with which the fresh juice is enclosed and protected at an early stage in its treatment and in which the protection is maintained while the liquid juice is being converted into a marketable package. To this end, we place the fresh juice in a container under a vacuum and agitate it in order to remove therefrom the dissolved air and gases which may have been collected in the respiration of the fruit or in the steps of separating the juice from the fruit and filtering it. The evacuated juice is then frozen with sufficient rapidity to avoid such separation as that suggested, and converted into frozen cakes of convenient size for distribution and use. We are not claiming herein any invention in the particular procedure to be followed in converting the juice into frozen cakes. Various methods may be followed, as hereinafter suggested, in freezing the juice into cakes of the desired size and form, or instead of producing the frozen cakes by direct freezing of the juice, if preferred the juice may be frozen into slabs or blocks, then comminuted, and finally molded by compression into the desired shape.

The method of our invention is further characterized by the step of protecting the cake of frozen fruit juice against evaporation and oxidation by forming thereon an aqueous glaze, preferably of air-free water. This may be formed by refrigerating the frozen cake to a temperature below the freezing point of water and then dipping the cake in air-free water so as to form a transparent protective glaze intimately adhering to the surface of the cake. The glaze thus formed is practically invisible yet substantially impervious to the passage of vapor from the enclosed juice as well as to the passage of oxygen or other gases to the same. Moreover, the glaze melts with the juice when the cake is thawed preparatory to its use and completely disappears without the necessity of being removed from the cake.

For purposes of illustration, our invention will now be described as practiced in the preparation of a marketable package of orange juice.

Fresh ripe oranges are cut in halves and each half is reamed out by pressing the flat surface of the cut orange against a rotary corrugated metal spindle of a well-known character. The juice is at once collected in a container, being passed through a sieve or filter to free the juice from pulp and fibre.

Having collected the juice in a container, it is next evacuated to free it from the gases it may contain and the air which may have been whipped into it in the reaming operation or otherwise. Satisfactory results are obtained by placing the filtered orange juice in a closed vessel in which a vacuum of approximately 28″ may be maintained and by shaking the vessel to agitate the juice during a period of 15 or 20 minutes of intermittent agitation. While a continuous agitation is effective in freeing air from the orange juice, intervals of rest are desirable for permitting air and gas bubbles to leave the surface of the juice. Agitation should be continued until practically all the entrapped air is released and this is indicated when no more bubbles of air rise from underneath the surface of the juice and no foam appears on its surface. It will be apparent that the removal of air from the juice prevents oxidation from that source.

When evacuation has been completed, the juice should be frozen. One practical method consists in running the juice directly into a mold and preferably this is effected by conducting it directly from the vessel in which it has been evacuated to the mold in order to avoid exposure to the atmosphere.

The molds employed may be of a size suitable for the individual consumer as, for example, a pint in capacity, or they may be of greater or smaller capacity, if desired. Freezing molds of non-corrosive Alleghany metal, restangular in shape and having the dimensions 3″ x 1″ x 8″ may be employed with satisfactory results. Such molds partially filled with orange juice may be immersed to the level of the juice in a bath of brine and the juice converted into a solid frozen cake in the mold.

We prefer to quick freeze the juice because of the resulting economy in time and because quick freezing takes place without tendency to cause separation in the components of the juice and to this end we prefer to refrigerate the brine to a temperature of $-40°$ F. or thereabouts.

Having converted the orange juice to a solid frozen cake, the cake is removed from the mold, which may be momentarily warmed for that purpose, and is then immediately glazed to protect its surface against oxidation and evaporation. To this end, the frozen cake, having a temperature considerably below the freezing point of water, is immediately dipped in water and allowed to stand in a cold room while the water on its surface freezes into a glaze. In this operation we preferably use water which has been freed of air by boiling or distilling and then cooled to a temperature of approximately $40°$ F. If preferred, the cakes may be dipped a second time to form a glaze of double thickness.

Having coated the frozen cake with a continuous ice glaze, the cakes are immediately wrapped in waxed paper, metallic foil, or other substantially moisture and vapor-proof envelope and are then ready to be packed in waxed-paper cartons, wherein they are preferably sealed, still further to reduce the possibility of evaporation from the glaze of the cake. Thus protected and wrapped, the orange juice may be kept for long periods in cold storage and upon being thawed returns to its natural state with substantially its full pristine flavor and aroma.

We have described our invention as being carried out in the preparation of a marketable package of orange juice but it will be understood that by the same procedure we may produce marketable packages of other fruit juices, mixtures of fruit juices, and in the term "fruit" is included berries. By a similar procedure, we are able also to package crushed fruit and berries with or without an admixture of their juices and we have employed the term "fruit substance" in the appended claims to designate either fruit juices or crushed fruit.

The freezing operation may be carried out in molds as above outlined or by the use of refrigerating apparatus such as that disclosed in the copending application of Bicknell Hall, filed May 20, 1931, Serial No. 538,649. If preferred, however, the frozen fruit substance may be shredded or comminuted and then molded by pressure into cakes of the desired size and shape.

The frozen cake of fruit substance may be protected by a glaze of air-free water in the manner above outlined, or, if preferred, solutions of sugar or salts in water, milk or other aqueous fluids may be used. Further, a cake of frozen fruit juice or crushed fruit which is easily affected by the oxygen of the atmosphere may be glazed with a less oxidizable fruit juice. For example, the juice of oranges or other citrus fruit may be clarified to a brilliantly clear solution by various methods which prevent further precipitation to any objectional extent. One of the best of these is by treating the fresh juice with a small quantity of a proteolytic enzyme and then filtering the treated juice. This enzyme treatment and filtering almost entirely removes the natural flavor of the juice, but the resulting solution is suitable for use in forming an ice glaze since it is not subject to objectionable oxidation or change of flavor from other causes. Moreover, it imparts an ornamental and attractive finish to the cakes to which it is applied.

An example of the application of our invention to the preparation of a chicken gravy will now be given. The gravy stock may be made by adding hot water to drippings in the pan in which chicken has been roasted. The fat is then skimmed from the stock and blended with flour in substantially the proportions; fat 4 oz., flour 3 oz. The fat and flour thus prepared are added to 1½ quarts of liquid stock and the whole is stirred until smooth and cooked until thickened. Giblets and flavoring material may be added to suit the taste.

The gravy thus prepared is placed in molds of Alleghany metal holding approximately 200 c.c. each and the molds are refrigerated, as by being placed in brine cooled to a temperature of −45° F. or thereabouts. The gravy is thus converted into solid cakes in a period of about 45 minutes. During the freezing process a small additional amount of gravy may be added to each mold to level the top surface thereof, which is otherwise bulged in the freezing process. The frozen cakes of gravy are removed from the molds by running warm water over the surface thereof while held in an inverted position. Preferably, the surface of the blocks will be hardened by allowing them to stand in a cold room at approximately −20° F. for a few minutes. The cakes are then protected by dipping them in distilled or freshly boiled water which has been cooled to about 40° F., thus forming a continuous ice glaze over the surface of the cakes. Preferably, each cake is dipped twice to increase the thickness of the glaze. After the glazing operation, each cake is wrapped in moisture-proof covering and placed in a waxed carton, which is then closed and sealed. Gravy packaged in this manner may be kept indefinitely in cold storage and distributed conveniently to the consumer. Upon being thawed, it returns practically to its initial condition, with full flavor as originally prepared.

Cream is another liquid food product which lends itself with particular advantage to packaging by the method of our invention and vegetable juices, specifically tomato juice, have been prepared and packaged with satisfactory results by the method above disclosed.

Having thus described our invention, what we claim as new and desire to secure by Letters Patent is:

1. The method of preparing liquid or semi-liquid food products which consists in forming the fresh product into a frozen cake having an exterior surface consisting entirely of the said product and then protecting it by completely enclosing the frozen cake in an aqueous glaze directly engaging the said surface.

2. The method of preparing liquid or semi-liquid food products which consists in removing the gaseous content of the product, freezing it into a cake of predetermined dimensions, and then enveloping the frozen cake in a continuous aqueous glaze.

3. The method of preparing liquid or semi-liquid food products which consists in agitating the product while maintaining it under a vacuum to remove its gaseous content, freezing the evacuated product into a solid cake, and then dipping the frozen cake to form an aqueous glaze thereon.

4. The method of preparing liquid or semi-liquid food products which consists in agitating the product while maintaining it under a vacuum to remove its gaseous content, placing the evacuated product in a mold with a minimum of exposure to the atmosphere, freezing the product into a solid cake of shape determined by the mold, and then dipping the frozen cake to form an aqueous glaze thereon.

5. The method of preparing fruit juices which consists in forming the juices into a frozen cake having an exterior surface consisting entirely of the juices, and then protecting the juice against oxidation and evaporation by glazing said surface of the cake with an aqueous glaze.

6. The method of preparing fruit juices which consists in separating the juices from the fresh fruit, removing the air contained in the juices, freezing the juices into a cake, and glazing the frozen cake with an aqueous glaze.

7. The method of packaging fruit juices which consists in converting the juices into a frozen cake, forming an ice glaze directly upon the surfaces of the frozen cake, and wrapping the glazed and frozen cake in a substantially moisture and vapor-proof covering adapted to protect the glaze from evaporation.

8. The method of packaging fruit juice which consists in subjecting the juice to agitation under a partial vacuum to remove its gaseous content, quick freezing the evacuated juice into a solid cake, dipping the frozen cake in air-free water to form a substantially impervious transparent glaze thereon, and enclosing the glazed cake in a substantially moisture and vapor-proof commercial container.

9. The method of preparing fruit juices which consists in forming a portion of the fresh juice into a frozen cake, treating another portion with an enzyme and filtering to form a de-flavored, clarified solution, and then glazing the frozen cake by dipping it in such solution.

10. A marketable package comprising a cake of a frozen food product which is normally liquid or semi-liquid and which has an exterior surface consisting entirely of said product, enclosed within a substantially impervious aqueous glaze directly engaging said surface.

11. A marketable package comprising a cake of frozen fruit juices having its exterior surfaces enclosed within an ice glaze directly engaging said surfaces.

12. A marketable package comprising fruit juices frozen into a cake and protected against oxidation, evaporation and tainting by a continuous glaze of air-free ice adhering to the surface of the frozen juices.

13. A marketable package comprising a solid cake of frozen fruit substance coated upon all its surfaces with a continuous aqueous glaze of less oxidizable material.

14. A marketable package comprising a solid cake of frozen fruit substance glazed upon its surface with a clarified and de-flavored fruit juice.

15. A marketable package comprising a fat-containing gravy, frozen into a solid cake and coated with an aqueous glaze protecting the frozen gravy against oxidation.

16. A marketable package comprising cream frozen into a solid cake and protected against oxidation, evaporation and tainting by an aqueous glaze, substantially impervious and transparent and adhering to the frozen surface of the cream.

DONALD K. TRESSLER.
KARL B. NORTON.